(12) United States Patent
Murray

(10) Patent No.: US 6,688,739 B2
(45) Date of Patent: Feb. 10, 2004

(54) IMAGE ACQUISITION DEVICE WITH INTEGRAL INK JET PRINTING

(75) Inventor: Richard A. Murray, San Diego, CA (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/858,329

(22) Filed: May 15, 2001

(65) Prior Publication Data

US 2002/0171693 A1 Nov. 21, 2002

(51) Int. Cl.$^7$ ................................................. B41J 19/94
(52) U.S. Cl. ........................ 347/104; 347/37; 347/109; 400/314
(58) Field of Search ............................. 347/2, 37, 108, 347/109, 104, 16; 400/88, 314 T, 320.1, 352, 354, 283, 578; 348/207, 372, 375

(56) References Cited

U.S. PATENT DOCUMENTS

| | | | | |
|---|---|---|---|---|
| 4,050,569 A | * | 9/1977 | Crump et al. | 400/314 |
| 4,337,467 A | * | 6/1982 | Yano | 347/56 |
| 4,758,845 A | * | 7/1988 | Tsushima et al. | 347/217 |
| 4,937,676 A | | 6/1990 | Finelli et al. | 348/375 |
| 5,005,998 A | | 4/1991 | Takanashi et al. | 400/208 |
| 5,402,156 A | * | 3/1995 | Donahue et al. | 347/37 |
| 5,456,540 A | * | 10/1995 | Jeutter | 400/88 |
| 5,757,388 A | | 5/1998 | Stephenson | 347/2 |
| 5,938,356 A | | 8/1999 | Wirth et al. | 400/636.3 |
| 5,999,203 A | | 12/1999 | Cane et al. | 347/171 |
| 6,000,781 A | * | 12/1999 | Akiyama et al. | 347/40 |
| 6,094,282 A | | 7/2000 | Hoda et al. | 358/296 |
| 6,149,256 A | | 11/2000 | McIntyre et al. | 347/2 |

FOREIGN PATENT DOCUMENTS

| | | | | |
|---|---|---|---|---|
| JP | 356060285 A | * | 5/1981 | B41J/19/00 |
| JP | 408217273 A | * | 8/1996 | B41J/13/00 |

* cited by examiner

*Primary Examiner*—Stephen D. Meier
*Assistant Examiner*—Julian D. Huffman
(74) *Attorney, Agent, or Firm*—Milton S. Sales; Thomas R. Arno

(57) ABSTRACT

A handheld imaging apparatus includes an image acquisition device and an ink jet printing in an integral housing. The printing drive may include a single motor that drives both a print carriage and a paper drive member for printing images created by the imaging acquisition device.

21 Claims, 7 Drawing Sheets

IMAGE ACQUISITION DEVICE WITH INTEGRAL INK JET PRINTING

BACKGROUND OF THE INVENTION

1. Field of the Invention

The present invention relates to electronic cameras and more specifically to the printing of images produced by such camera.

2. Description of the Related Art

Digital cameras, digital phones, PDAs and the like which obtain and display acquired images electronically are in widespread use. Digital images produced from these devices are typically stored in memory and these images can be shown on a display so that the user can determine which image should be stored for use in producing hard copy images. Typically, these images can be stored in a magnetic disk or a compact PCMCIA Flash RAM Card. Once stored, the image data is generally downloaded to a separate print apparatus for hard copy production.

More recently, attempts have been made to incorporate printing apparatus into the cameras themselves so that no separate printing apparatus is required. With such a combination camera/printing apparatus, images can be acquired and printed at any location, without waiting to perform a separate image download to other processing and print apparatus.

One example of this type of combination camera and printing apparatus is provided in U.S. Pat. No. 5,757,388 to Stephenson. This document shows an electronic imaging camera and an ink jet printing apparatus which can be interconnected for use either in combination or apart. In this device, the image acquisition apparatus is provided in one housing, and the printing apparatus is provided in a second separate housing. This device is thus essentially two separate devices with a means for coupling the two together. Another example camera/printing apparatus combination is provided by U.S. Pat. No. 6,149,256 to McIntyre. In this case, a single housing includes the image acquisition apparatus and a page wide print head. A separate housing is used to provide sheets of paper, ink, and a power supply for the printing apparatus. Although both of these documents describe combination camera and printing apparatus embodiments, neither is designed to optimize print quality while minimizing the size and cost of producing and operating the apparatus.

SUMMARY OF THE INVENTION

In one embodiment, the invention comprises a handheld image acquisition apparatus comprising a first housing having mounted therein an image acquisition device, processing circuitry coupled to the image acquisition device and configured to receive image data from the image acquisition device and to process the image data into pixel data forming a plurality of image planes of different colors and an ink jet printing apparatus. The printing apparatus comprises an ink receiving media drive member configured to advance ink receiving media in a first direction and a scanning ink jet print head coupled to receive the pixel data and to eject droplets of liquid ink onto the ink receiving media in accordance with the pixel data by repeated motion transverse to the first direction of media advance. The apparatus further comprises a second housing insertable into and removable from the first housing, the second housing containing sheets of the ink receiving media.

In another embodiment, a printing apparatus comprises a paper drive roller and a print carriage mounted on the paper drive roller. A drive motor is attached to the print carriage, and the motor is configured to move the print carriage along the paper drive roller. In one embodiment, a cam is connected to at least one end of the paper drive roller, and an actuator attached to the print carriage is positioned such that when the drive motor moves the print carriage to an end of the paper drive roller, the actuator engages the cam and causes the paper drive roller to rotate.

Another printing apparatus embodiment comprises a moveable ink jet print head mounted on a combination guide rod and media advance roller.

In addition, a combination image acquisition device and ink jet printing apparatus is provided which comprises a first housing containing an image aquisition device and a moveable ink jet print head mounted on a guide rod. In this embodiment, a a second housing contains sheets of ink receiving media and is inserted into the first housing to a position in which a portion of the second housing resides beneath the guide rod during the printing process.

DETAILED DESCRIPTION OF THE PREFERRED EMBODIMENT

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

The invention is directed to an imaging acquisition device and a compact ink jet printing apparatus contained in an integral housing. The imaging acquisition device could be a digital camera of conventional design and can capture either still or motion images. Such cameras often have a flat panel color display that is used to frame and/or review captured images.

Figure 1:
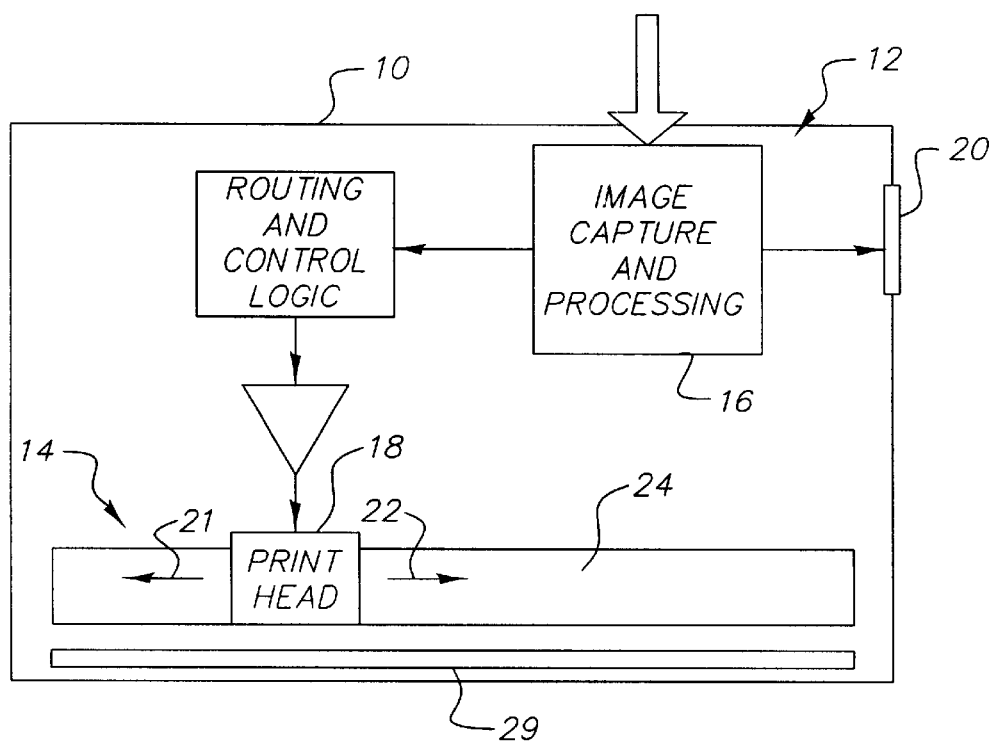
FIG. 1 is a block diagram of a digital camera and ink jet printing apparatus in an integral housing in accordance with the present invention.

Turning now to FIG. 1, a housing 10 with an image acquisition device 12 and an ink jet printing apparatus 14 is shown. Images are captured by the image acquisition device 12 which typically includes an optical system and an image sensor such as a CCD. The device may be a camera, PDA, cell phone, or any device that receives and stores images. Digital image data, which may be in raster format, from image capture circuitry 16 is transferred to a scanning print head 18 for hard copy image production as will be described in additional detail below. The image capture circuitry 16 may additionally include a storage memory for storing digital images captured by the system. These stored images may be used to drive a display 20 in a well known manner. Display 20 can be for instance a LCD or organic polymer display system of conventional design.

The image capture electronics processes the data and formats it for immediate printing by organizing the data in scan lines according to the physical layout of the ink jet print head. This organization allows the image capture electronics to perform a majority of the processing functions and thereby allows straightforward reproduction of image data by print the ink jet print head with minimal additional processing, thereby reducing redundant hardware including additional memory, resulting in reduction of the cost of the device.

In advantageous embodiments of the invention, the print head 18 contained within the housing 10 is a scanning print head which is moveable in the direction of arrows 21 and 22 along a guide rod 24 over a sheet of ink receiving media 29, typically paper. During the printing process, the media 29 is advanced in a first direction (out of the plane of FIG. 1) with a media advance drive member, while the scanning print head travels back and forth across the media 29 in a direction transverse to the first direction of media advance depositing swaths of ink droplets. In this manner, an image is formed by the ink jet printing apparatus. There are many advantages to the scanning print head over page wide non-moving ink jet head designs. Not only are smaller moving print heads less expensive and easier to replace, but they produce a higher print quality as well. This is because droplet deposition errors are randomized and spread throughout the image by the movement of the print head. With page wide print heads, droplet deposition errors tend to be systematic, occurring in bands within the image, and producing non correctable imperfections in print quality which are much more noticeable to the human eye than random errors. In one advantageous embodiment, the guide rod 24 on which the print head 18 is mounted also forms the media drive member. This is illustrated more fully in FIG. 2.

Figure 2:
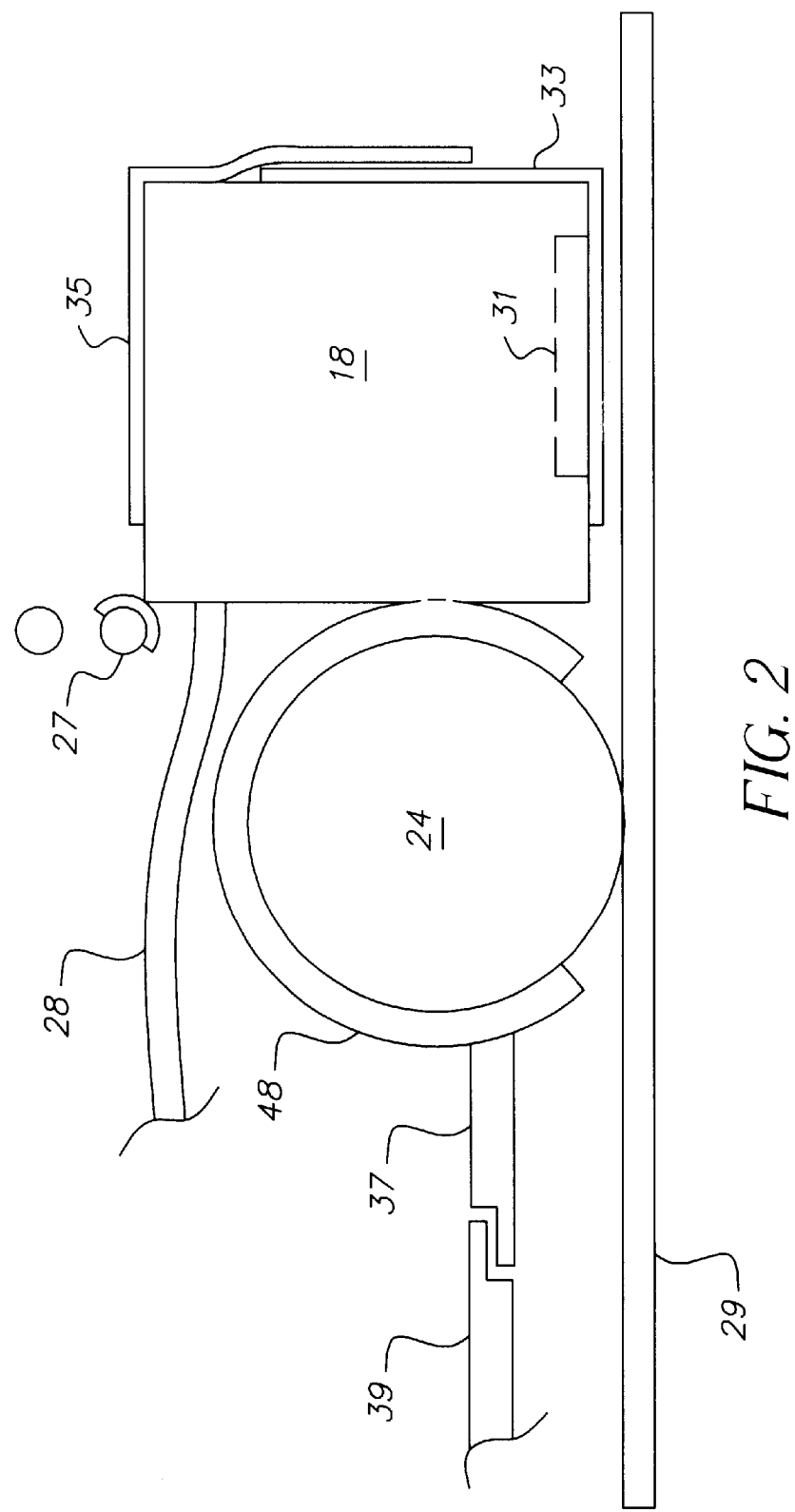
FIG. 2 is a cross sectional view of the printing apparatus assembly of FIG. 1 along the line 2—2 of FIG. 1.

FIG. 2 is a cross sectional view of the printing assembly 14 along lines 2—2 of FIG. 1. As seen in this Figure, the ink jet print head 18 may be mounted to or incorporate a bushing 48 which slidably engages the guide rod 24. The guide rod 24 is free to rotate within the bushing 48. The bottom surface of the guide rod 24 contacts the top sheet 29 of a stack of media such that when the guide rod 24 is incrementally rotated, the top media sheet 29 is also advanced. The print head is rotationally supported in a manner similar to that of conventional ink jet printer, with an extension 37 that slides along a support surface 39 that is behind the print head. Thus, the rotatable guide rod 24, disposed over the media stack, is actuated to advance one of the media sheets 50 past the ink jet print carriage 22 during the printing process.

To produce the transverse print head motion, the print head is coupled to a drive belt assembly 27. Other print head moving systems may utilize a motor and screw drive instead of drive belt. Ink supply tubing 28 supplies ink from ink reservoirs outside the print head 18. As in conventional ink jet print heads, the print head 18 has a jet plate 31 on its bottom surface containing nozzles for ink ejection. The jet plate is coupled to a flex circuit 33 which routes electrical signals to the jet plate for nozzle actuation. To produce a low profile head for small size, the flex circuit 33 is routed around to the front surface of the print head 1. Electrical contacts on this portion of the flex circuit 33 connect to mating electrical contacts on a second flex circuit 35 which is connected via a trailing cable connection to driver and routing control logic and to the processing circuitry 16 of FIG. 1 so as to control ink ejection during the image printing process. A specific advantageous method and apparatus for producing the desired media and print head motion is described in more detail below with reference to FIGS. 5, 6, and 7.

Figure 3A:
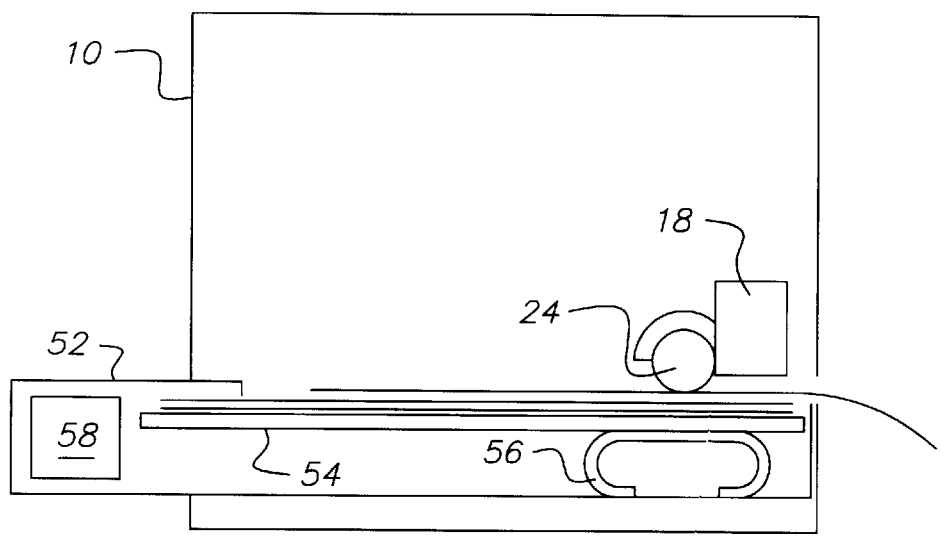
FIG. 3A is a cutaway side view of the camera/printing apparatus of FIGS. 1 and 2 with a removable media pack installed.
Figure 3B:
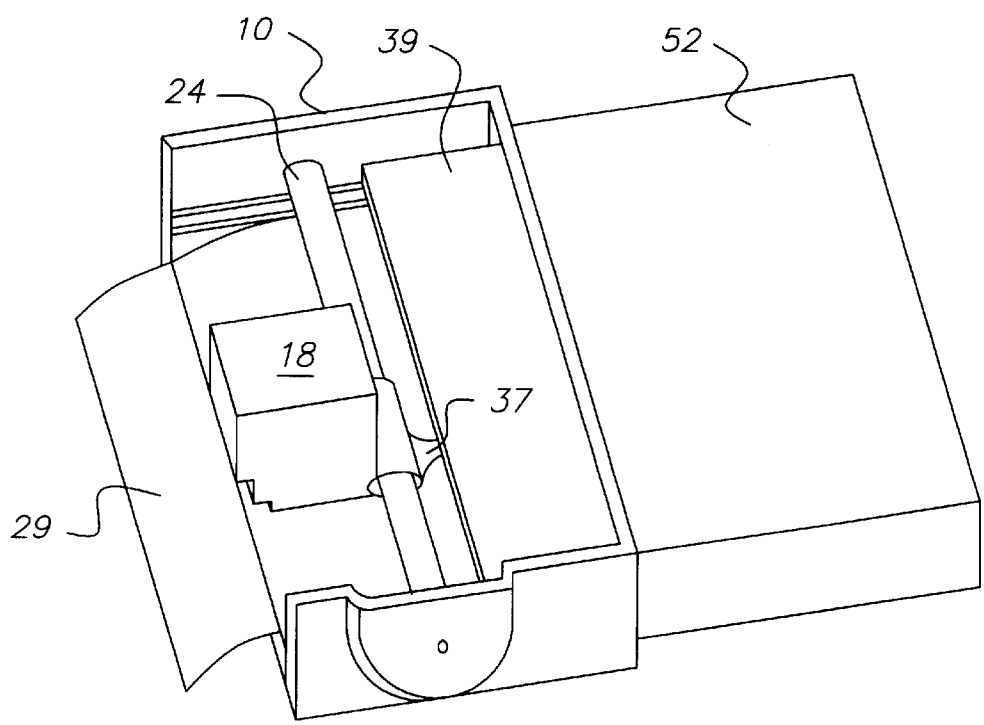
FIG. 3B is a perspective view of the camera/printing apparatus of FIGS. 1 and 2 with the camera housing cut away.

In one embodiment, illustrated in FIGS. 3A and 3B, the media sheets are housed in a media pack that is user insertable into and user removable from the housing 10 containing the image acquisition and printing apparatus. The media may thus be incorporated into a second housing 52 separate from the first housing 10, forming an inexpensive, disposable media pack for the camera/printing system. In some advantageous embodiments, the second housing 52 may be inserted into the first housing 10 from the rear. In one media pack embodiment, the media sheets rest on a spring loaded platen 54. A biasing member 56 urges the platen 54 with the media sheets 50 against the guide rod/drive roller 24. The second housing 52 may also include an ink reservoir 58 which couples to the ink supply tubing 28 when the media housing 52 is installed in the camera/printing apparatus housing 10.

The relationship between the media pack and printing apparatus when the media pack housing 52 is installed in the housing 10 is such that print head travel is over the front portion of the media pack housing 52 and above the media sheets as they sit inside the housing 52. This reduces the total size of the device as media sheets need not be advanced to a printer assembly which is spatially separated from the media source in order to initiate the print process. As will be explained further below, this arrangement also allows a print head service station area to be incorporated into the media pack.

Figure 4:
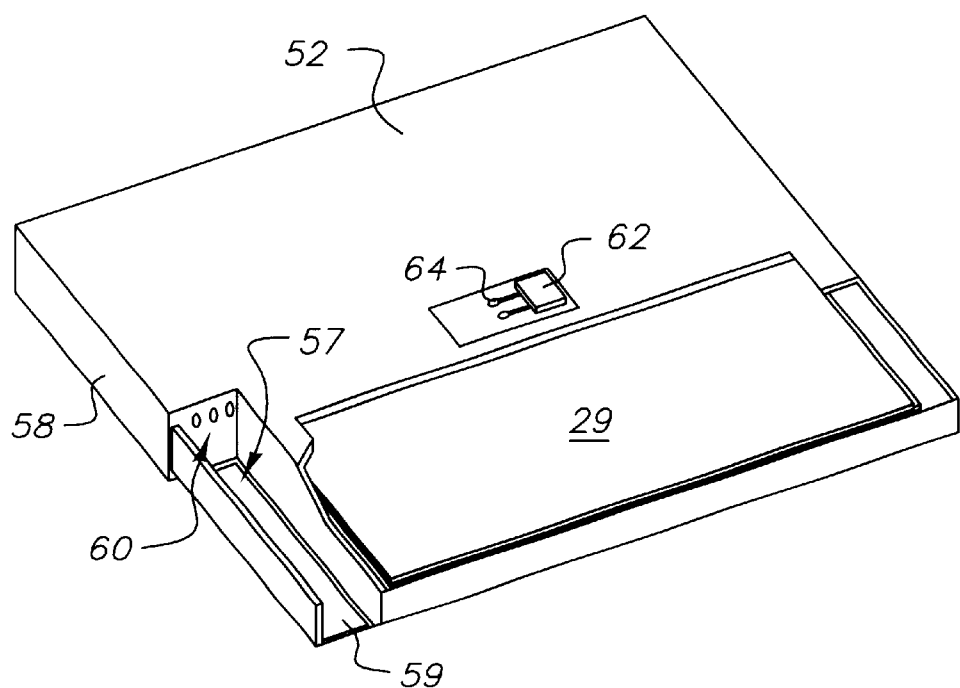
FIG. 4 is a perspective view of the removable media pack of FIG. 3 removed from the camera.

FIG. 4 is a perspective view of the removable media pack illustrated in FIG. 3. The housing 52 includes media 30, which is exposed to contact from the guide rod/drive roller 24 when installed in the camera/printing apparatus. Also provided are ink outlets 60 for coupling to the ink supply tubing 28. In one advantageous embodiment, the media pack includes a writable and readable memory element 62, such as a FLASH memory. With this memory element 62, not only can initial characteristics of the media pack be stored, such as ink or media type, or initial number of media sheets provided, but also, the information can be updated so that the user can be kept informed, for example, of how many media sheets are left or how many have been used. Also, if the media pack is removed from the camera & later reinserted, the camera may automatically determine the number of sheets left. When sheets are used up or low, the camera knows this and may stop printing requests or notify user to replace with a new media pack. The memory element may incorporate a two pin serial bus which allows easy access by the image processing apparatus. Using this common serial bus technique, power may also be provided without use of additional interface pins. Such memory devices are commercially available from Dallas Semiconductors and others.

The memory element is advantageously placed on the top surface of the housing 52 and is connected to electrical contacts 64 for interfacing with the electronics in the camera/printing apparatus. Referring back to FIG. 3B, this placement allows the electrical contacts 64 to mate with contacts on a main printing apparatus circuit board (not shown) mounted to the shelf 39 in the camera housing 10. This eliminates the need to provide an additional interface circuit board in the camera housing to interface with the memory element contacts 64, thus minimizing the cost and size of the device.

In addition, the housing 52 may include a print head service station area 57 with an ink absorbent foam pad 59. During printing, the print head can travel past the media edge and eject droplets (or "spit") over the foam pad 59 to clear nozzles. This area may also include other components (not shown) such as a print head wiper and a rubber seal for sealing the ink jet print head when not in use, as are commonly provided on larger scale ink jet printers. When idle, the print head would reside over this area of the media pack above the foam pad and sealed, if a seal is provided. With this embodiment, mess from waste ink and print head servicing is quickly disposed of with each replacement of the media pack.

Figure 5:
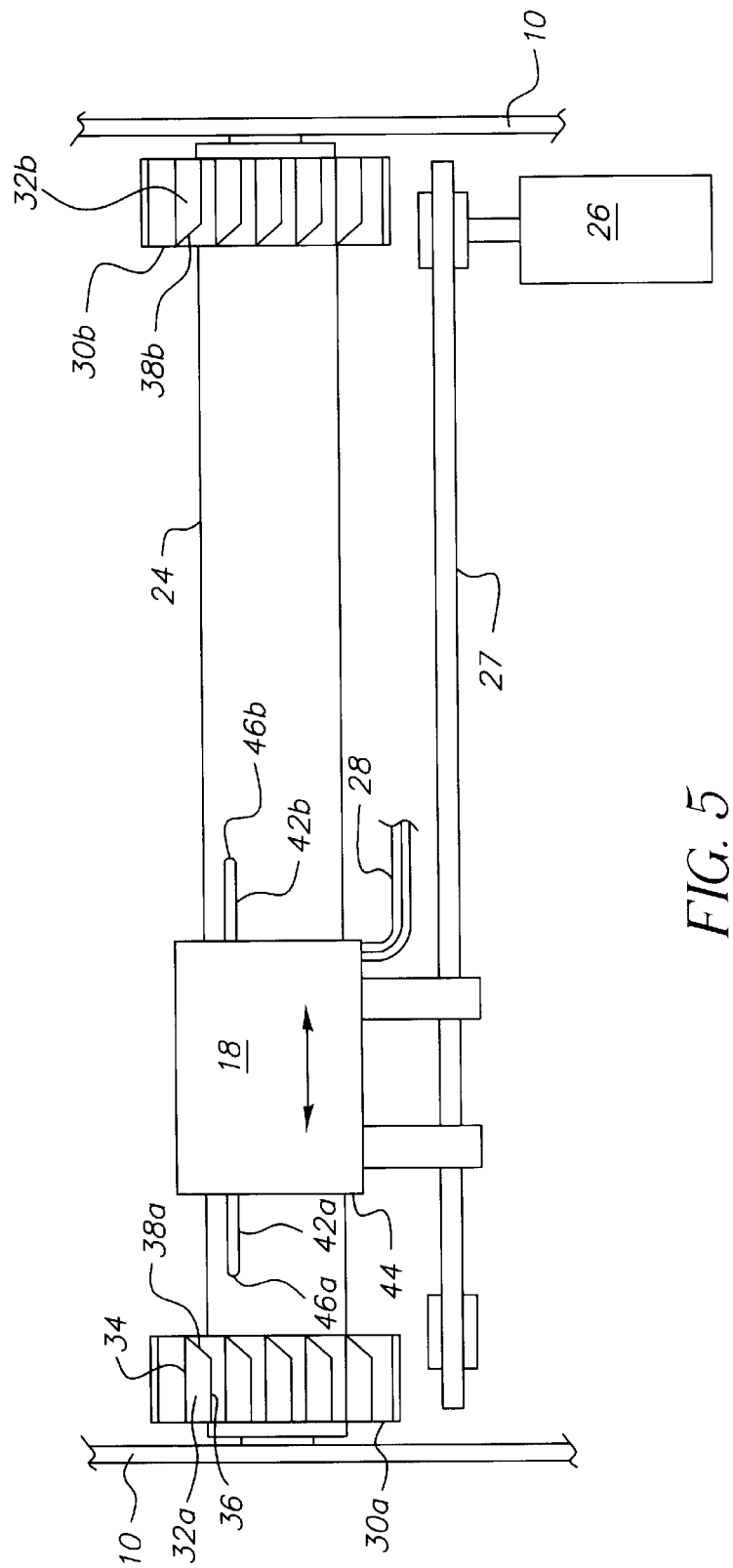
FIG. 5 is a top view of an ink jet printing apparatus carriage assembly with cam structures for media advance.
Figure 6A:
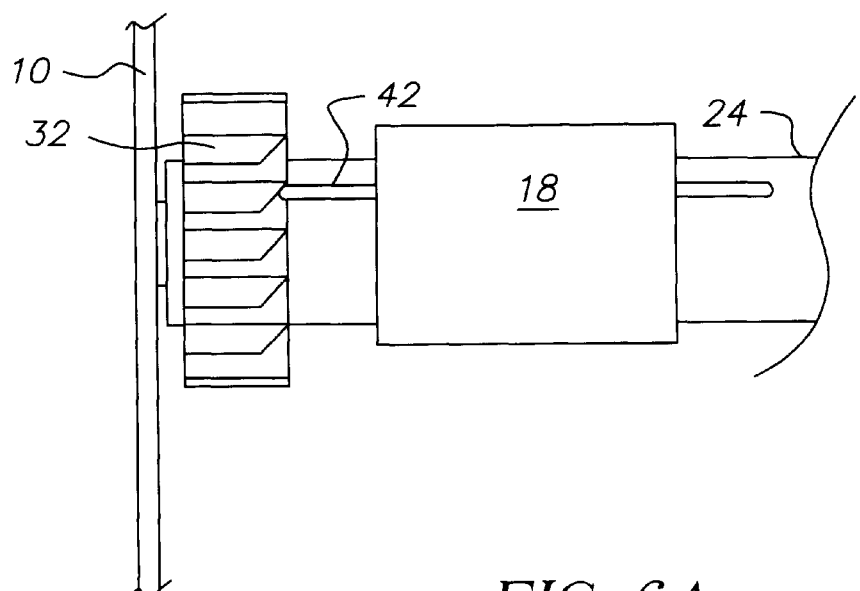
FIG. 6A is a top view of the assembly of FIG. 5 with the cam in a first position.
Figure 6B:
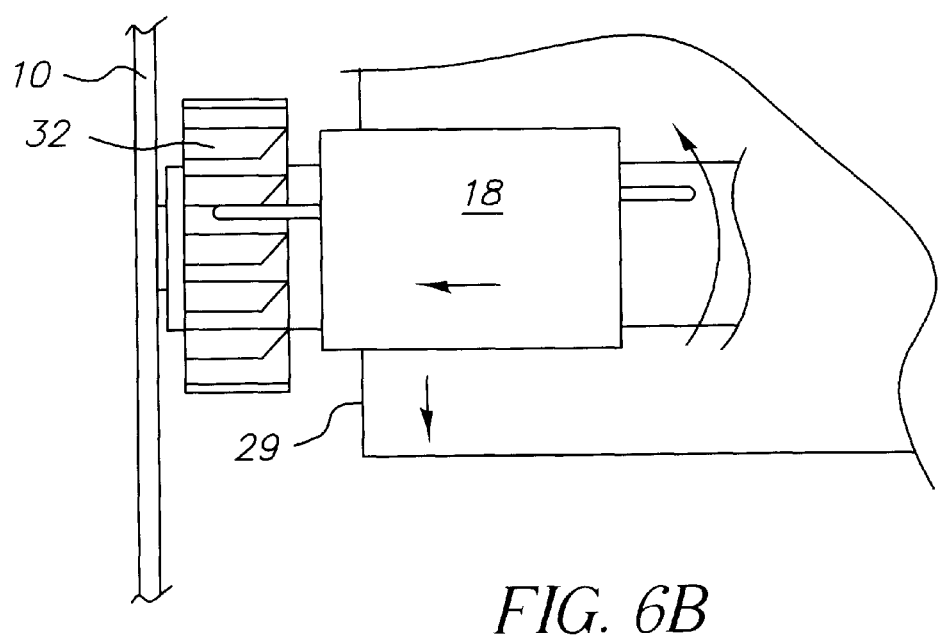
FIG. 6B is a top view of the assembly of FIG. 5 with the cam rotated to a second position.

Turning now to FIGS. 5, 6A, and 6B, an advantageous print head and media advance mechanism is described. The embodiments shown in these figures are especially advantageous in this application because only a single motor is required to advance both the print head and the media. This allows for both space and cost savings in a combined camera/printing apparatus.

Referring now to FIG. 5, a bidirectional printing apparatus (wherein ink is deposited when the print head moves in both directions across the media) is illustrated. As described above, the ink jet print head 18 is slidably mounted on the guide rod and paper drive roller 24 to enable motion of the ink jet print head along the paper drive roller 24 and to define a linear path, as shown by the bi-directional arrow in FIG. 5, along which the ink jet print head 22 moves. A motor 26 and drive belt mechanism 27 (or screw drive, for example) are used to drive the ink jet print head 18 along the paper drive roller 24.

The paper drive roller 24 is attached at each end to a cam 30a, 30b. The cams 30 are generally circular disks with a plurality of protrusions 32a, 32b on their outer circumference. Each protrusion 32 is configured such that a driving surface 38a, 38b is created at an angle relative to the inner face 36 of the protrusion 32. Alternately, other embodiments of protrusions 32 can be used that provide driving surfaces on the cams 30.

The print head 18 includes extended actuators 42a, 42b protruding from the sides of the print head 18. A protruding end 46a, 46b of the actuator may be shaped at an angle or it may be rounded so that each protruding end 46 can engage with the driving surface 38 of one of the protrusions 32 on the cam 30.

As the print head 18 reaches one end of travel along the paper drive roller 24, the drive motor 26 pushes the protruding end 46a of the actuator against the driving surface 38a of a protrusion on the end of cam 30a, causing the cam 30a (and the attached drive roller) to rotate from a first position as shown in FIG. 6A to a second position as shown in FIG. 6B. The rotation of the cam 30 rotates the paper drive roller 24, thereby advancing the media sheet 50 an incremental amount.

When the print head 18 travels back to the other side of the roller 24, the actuator 42b on the other side of the print head contacts the driving surface 38b on the other cam 30b, causing a similar rotation of the paper drive roller. The protrusions on the cam 30a are rotationally out of phase with the protrusions on the cam 30b, such that the rotation caused at one end positions the protrusions on the cam at the other end into the proper position to be engaged with the other actuator.

Accordingly, a printed image is formed on the media sheet 50 by advancing the media sheet in incremental amounts using paper drive roller 24 each time the print head 18 reaches an end of travel along the paper roller 24.

Figure 7A:
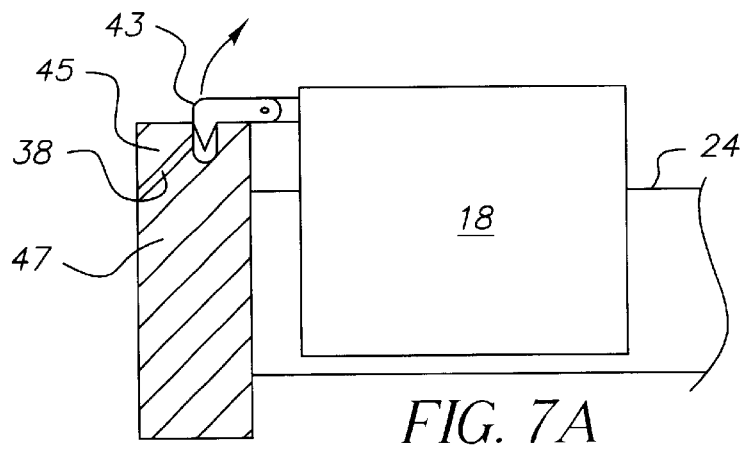
FIG. 7A is a side view of a second embodiment of a cam structure for media advance.
Figure 7B:
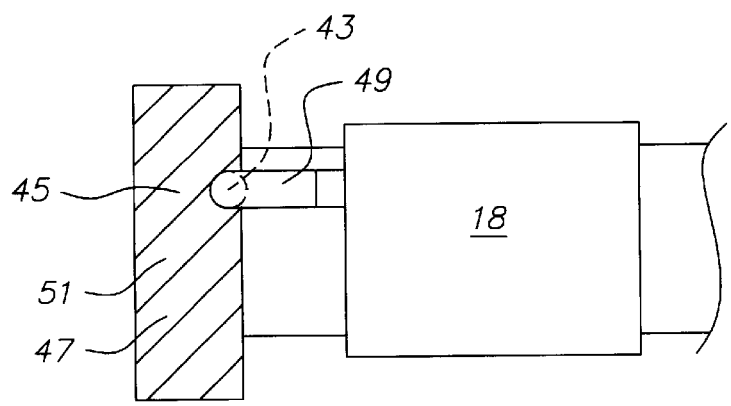
FIG. 7B is a top view of the embodiment of FIG. 7A with the cam in a first position.
Figure 7C:
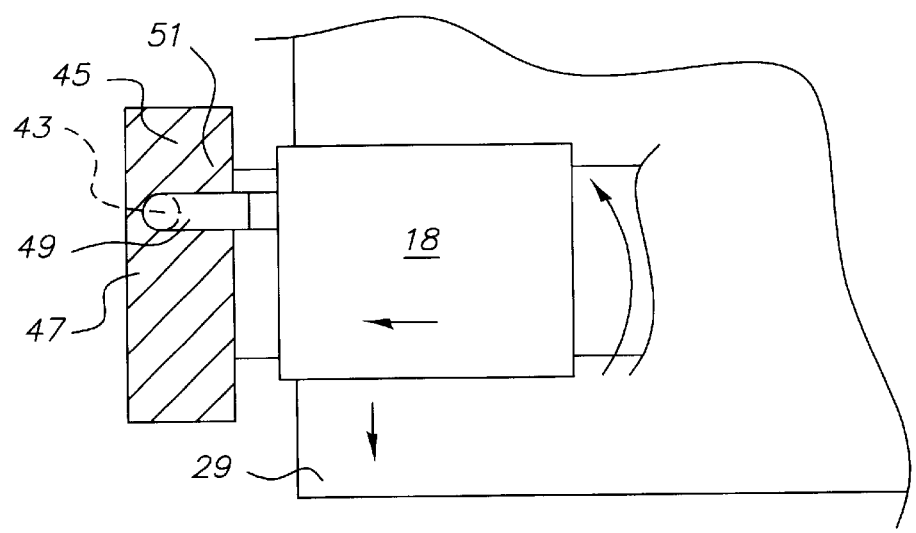
FIG. 7C is a top view of the embodiment of FIG. 7A with the cam rotated to a second position.

Another embodiment suitable for unidirectional printing (wherein ink is deposited during only one direction of print head travel) is shown in FIGS. 7A, 7B, and 7C. In this case, only one cam 30 is required. In this embodiment, the protrusion 42 may comprise an articulating arm with a downwardly projecting tip 43 as shown in the side view of FIG. 7A. As the print head 18 moves toward the cam 30, the tip 43 moves along the driving surface 38 of a protrusion 45 advancing the cam 30. During this process, the tip 43 moves behind the adjacent protrusion 47 and in the gap 51 between the protrusion 45 and the protrusion 47, while the horizontally extending portion 49 of the actuator passes over the top of the adjacent protrusion 47 as shown in FIGS. 7B and 7C. The arm is hinged such that on return motion, the tip 43 can rise up and over the rear surface of the adjacent protrusion 47, releasing the cam 30 as the print head moves away toward the other side of the roller 24. When the print head returns on the next pass, the tip 43 is positioned to engage the front of the adjacent protrusion 47, again advancing the cam 30 and the roller 24. In this way, the media advance is accomplished in a single sided operation.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A handheld image acquisition apparatus comprising:
  a first housing having mounted therein;
    (a) an image acquisition device;
    (b) processing circuitry coupled to said image acquisition device and configured to receive image data from said image acquisition device and to process said image data into pixel data forming a plurality of image planes of different colors;
    (c) an ink jet printing apparatus comprising (1) an ink receiving media drive member configured to advance ink receiving media in a first direction and (2) a scanning ink jet print head mounted on said ink receiving media drive member, wherein said print head is coupled to receive said pixel data and to eject droplets of liquid ink onto said ink receiving media in accordance with said pixel data by repeated motion transverse to said first direction of media advance, and wherein said ink receiving media drive member is caused to rotate by the motion of said print head; and
  a second housing insertable into and removable from said first housing, said second housing containing sheets of said ink receiving media.

2. The apparatus of claim 1, wherein said second housing contains liquid ink.

3. The apparatus of claim 2, wherein said second housing contains liquid ink of two or more colors.

4. The apparatus of claim 1, additionally comprising:
a drive motor attached to the print head, said motor configured to move the print head along the media drive member;
a cam connected to at least one end of said media drive member;
an actuator attached to the print head and positioned such that when the drive motor moves the print head substantially to the end of the paper drive member, said actuator engages the cam and causes the media drive member to rotate.

5. The apparatus of claim 4, comprising a cam connected to each side of said media drive member.

6. The apparatus at of claim 4, wherein the cam includes at least one protrusion on its outer circumference.

7. The apparatus of claim 4, wherein the at least one protrusion includes a driving surface angled with respect to an inner face of the cam.

8. The apparatus of claim 4, wherein said actuator comprises an articulating arm with a downwardly extending tip.

9. The apparatus of claim 8, wherein a cam is provided at only one end of said media drive member.

10. The hand held imaging apparatus of claim 1, additionally comprising a single drive motor mounted within said first housing, wherein both print head and paper drive member are caused to move by the single drive motor.

11. The apparatus of claim 1, wherein the print head comprises a bushing that mounts on the media drive roller, wherein said bushing is configured to move in a linear direction along the media drive roller, said bushing further configured to allow rotational movement of the media drive roller with respect to the print head.

12. A method of printing in a handheld imaging apparatus, comprising:
acquiring image data;
processing said image data into pixel data forming a plurality of image planes of different colors;
moving a print head over a substrate with a drive motor, wherein said print head is mounted on and moves over a portion of a combination guide rod/media advance roller;
ejecting droplets of liquid ink from said print head onto said substrate in accordance with said pixel data; and
periodically advancing said substrate beneath said print head by contacting said substrate with said portion of said combination guide rod/media advance roller over which said print head moves and rotating said combination guide rod/media advance roller using said print head motion as a driving force.

13. The method of claim 12, comprising mechanically coupling said print head to a media drive member while said print head is in motion.

14. A method of printing comprising:
moving a print head over a substrate with a drive motor, wherein said print head is mounted on a guide rod/media advance roller, and wherein said moving comprises moving said print head along said guide rod/media advance roller; and
periodically advancing said substrate beneath said print carriage by contacting said substrate with said guide rod/media advance roller and rotating said guide rod/media advance roller,
wherein moving the print head periodically includes engaging an actuator on the print head with a cam and causing said cam to rotate, thereby causing said guide rod/media advance roller to rotate and the substrate to advance, and wherein contacting said substrate comprises contacting said substrate with at least a portion of said guide rod/media advance roller along which said print head moves.

15. A printing apparatus comprising:
a paper drive roller, said roller configured so that a portion of said roller contacts paper during printing;
an print carriage mounted on the paper drive roller;
a drive motor attached to the print carriage, said motor configured to move the print carriage along said portion of the paper drive roller that contacts paper;
a cam connected to at least one end of said paper drive roller;
an actuator attached to the print carriage and positioned such that when the drive motor moves the print carriage to an end of the paper drive roller, said actuator engages the cam and causes the paper drive roller to rotate.

16. The printing apparatus of claim 15, wherein both print carriage and paper drive roller are caused to move by the drive motor.

17. The printing apparatus of claim 15, wherein the cam includes at least one protrusion on the outer circumference of the cam.

18. The printing apparatus of claim 17, wherein the at least one protrusion includes a driving surface angled with respect to an inner face of the cam.

19. A printing apparatus comprising a moveable ink jet print head mounted on a combination guide rod/media advance roller, wherein said print head is mounted on and moves over a portion of said combination guide rod/media advance roller that is configured to contact media, and wherein said combination guide rod/media advance roller advances said media by the motion of said print head.

20. A combination image acquisition device and ink jet printing apparatus comprising:
a first housing containing an image acquisition device and a moveable ink jet print head mounted on a guide rod, wherein said guide rod also comprises a media advance roller; and
a second housing containing sheets of ink receiving media inserted into said first housing to a position in which a portion of said second housing resides beneath said guide rod during the printing process, wherein said second housing is inserted into said first housing such that a top media sheet contacts said guide rod/media advance roller.

21. A printing apparatus comprising a moveable ink jet print head mounted on a single combination guide rod/media advance roller, wherein said print head is mounted on and moves over a portion of said combination guide rod/media advance roller that is configured to contact media, wherein said combination guide rod/media advance roller is caused to rotate by the motion of said print head along said combination guide rod/media advance roller.

* * * * *

UNITED STATES PATENT AND TRADEMARK OFFICE
CERTIFICATE OF CORRECTION

PATENT NO.    : 6,688,739 B2
DATED         : February 10, 2004
INVENTOR(S)   : Richard A. Murray It is certified that error appears in the above-identified patent and that said Letters Patent is hereby corrected as shown below:

Column 7,
Line 18, delete the word "at"
Line 20, replace the text "of claim 4" with -- of claim 6 --.
Line 60, delete the word "a" first occurrence Column 8,
Line 15, replace the text "an print carriage" with -- a print carriage --.

Signed and Sealed this

Third Day of August, 2004

JON W. DUDAS
*Acting Director of the United States Patent and Trademark Office*